(12) United States Patent
Sastry et al.

(10) Patent No.: US 11,663,256 B2
(45) Date of Patent: May 30, 2023

(54) SEARCHING DATA REPOSITORIES USING PICTOGRAMS AND MACHINE LEARNING

(71) Applicant: Kyndryl, Inc., New York, NY (US)

(72) Inventors: Shashidhar Sastry, Pune (IN); Rahul Chenny, Bangalore (IN)

(73) Assignee: KYNDRYL, INC., New York, NY (US)

( * ) Notice: Subject to any disclaimer, the term of this patent is extended or adjusted under 35 U.S.C. 154(b) by 108 days.

(21) Appl. No.: 17/348,362

(22) Filed: Jun. 15, 2021

(65) Prior Publication Data

US 2022/0398272 A1   Dec. 15, 2022

(51) Int. Cl.
*G06F 16/33* (2019.01)
*G06F 16/383* (2019.01)
*G06N 20/00* (2019.01)
*G06F 8/36* (2018.01)
*G06F 16/84* (2019.01)

(52) U.S. Cl.
CPC ............ *G06F 16/3346* (2019.01); *G06F 8/36* (2013.01); *G06F 16/383* (2019.01); *G06F 16/86* (2019.01); *G06N 20/00* (2019.01)

(58) Field of Classification Search
CPC ..... G06F 16/3346; G06F 16/86; G06F 16/383
See application file for complete search history.

(56) References Cited

U.S. PATENT DOCUMENTS

| 6,263,339 | B1 * | 7/2001 | Hirsch ................ G06F 16/289 717/109 |
| 6,473,794 | B1 | 10/2002 | Guheen et al. |
| 8,122,017 | B1 | 2/2012 | Sung et al. |
| 8,290,762 | B2 | 10/2012 | Kodosky et al. |
| 8,434,062 | B2 | 4/2013 | Gawor et al. |
| 8,656,351 | B2 | 2/2014 | Kodosky et al. |
| 8,972,372 | B2 | 3/2015 | Elbaum et al. |
| 2003/0101195 | A1 | 5/2003 | Linhart |

(Continued)

FOREIGN PATENT DOCUMENTS

DE   60223593 T2   9/2008

OTHER PUBLICATIONS

Mell, Peter, et al., "The NIST Definition of Cloud Computing," Sep. 2011, 7 pages.

(Continued)

*Primary Examiner* — Baoquoc N To
(74) *Attorney, Agent, or Firm* — Tutunjian & Bitetto, P.C.; Dan Housley

(57) ABSTRACT

A pictogram repository is created of pictograms including expressions that are mapped to at least a portion of source code that is stored in a separate source code repository. A score is recorded for developers for the source code that is stored in the source code repository. A source code search inquiry of at least one pictograms for search query elements is conducted, in which the at least one pictogram for the search query elements are matched to the pictograms in the repository of pictograms that includes expressions that are mapped to at least a portion of source code that is stored in the separate source code repository. Matching source code have the score for their developer checked against a threshold value. Source code meeting the search query elements and having a score for their developer meeting the threshold value are retrieved.

20 Claims, 10 Drawing Sheets

(56) References Cited

U.S. PATENT DOCUMENTS

2004/0117730 A1\* 6/2004 Ibrahim ............... G11B 27/034
2018/0081881 A1 3/2018 Poddar et al.

OTHER PUBLICATIONS

Mishne, Gilad, "Source code retrieval using conceptual graphs," Dec. 2003, 72 pages.
Baltes, Sebastian, et al., "Linking sketches and diagrams to source code artifacts," Proceedings of the 22nd ACM SIGSOFT International Symposium on Foundations of Software Engineering, Nov. 2014, pp. 743-746.
Anonymous, "Method and System for Automatically Correlating Source Code with Design Artifacts," IP.com Prior Art Database Technical Disclosure, https://ip.com/IPCOM/000256244, Nov. 2018, 3 pages.

\* cited by examiner

SEARCHING DATA REPOSITORIES USING PICTOGRAMS AND MACHINE LEARNING

BACKGROUND

The present invention generally relates to managing data storage on repositories, and more particularly to methods for searching source code.

Source code repositories have grown in content over the recent years. A developer (or contributor) can create a repository which contains a description (meta data) of the code. The developer (or contributor) may want to share the source code repositories publicly or to a limited group. The availability of voluminous code repositories, can present a challenge for those attempting to locate source code matching their requirements by searching the code repositories.

SUMMARY

In accordance with an embodiment of the present invention, a computer-implemented method is provided for searching stored data using pictograms as search query elements. In some embodiments, the method may include creating a pictogram repository of pictograms including expressions that are mapped to at least a portion of data that is stored in a separate data repository. A score is recorded for developers for the at least the portion the data that is stored in data repository. In some embodiments, the method further includes receiving a search inquiry including at least one pictogram for search query elements. The at least one pictogram for the search query elements are matched to the pictograms in the repository of pictograms that includes expressions that are mapped to at least a portion of data that is stored in the separate data repository. Matching data from the pictograms in the repository of pictograms corresponding to the at least one pictograms for search query elements have the score for their developer checked against a threshold value. Returning data meeting the search query elements and having a score for their developer meeting the threshold value to users that provided the search inquiry. In some embodiments, the data being searched is source code, e.g., source code stored in a source code repository.

In another embodiment, a system for searching stored data using pictograms as search query elements is provided that includes a hardware processor, and a memory that stores a computer program product. The computer program product stored on the memory when executed by the hardware processor, causes the hardware processor to create a pictogram repository of pictograms including expressions that are mapped to at least a portion of data that is stored in a separate data repository. The system can also record a score for developers for the at least the portion of data that is stored in the data repository. In some embodiments, the system causes the hardware processor to receive a search inquiry including at least one pictogram for search query elements. The at least one pictogram for the search query elements is matched to the pictograms in the repository of pictograms that includes expressions that are mapped to at least a portion of data that is stored in the separate data repository. The system also causes the hardware processor to check the development score for the matched data from the pictograms in the repository of pictograms corresponding to the at least one pictograms for search query elements against a threshold value. The system can also retrieve data meeting the search query elements and having a score for their developer meeting the threshold value to users that provided the search inquiry. In some embodiments, the data being searched is source code, e.g., source code stored in a source code repository.

In yet another embodiment, a computer program product is provided for using pictograms as search query elements. The computer program product includes a computer readable storage medium having computer readable program code embodied therewith. The program instructions executable by a processor to cause the processor to create, using the processor, a pictogram repository of pictograms including expressions that are mapped to at least a portion of data that is stored in a separate data repository. The program instructions can also record, using the processor, a score for developers for the at least the portion of data that is stored in the data repository. In some embodiments, the program instructions include to receive, using the processor, a search inquiry of at least one pictograms for search query elements. The at least one pictogram for the search query elements are matched to the pictograms in the repository of pictograms that includes expressions that are mapped to at least a portion of data that is stored in the separate data repository. The program instructions can also check, using the processor, the score of the developer for the matching data from the pictograms in the repository of pictograms corresponding to the at least one pictograms for search query elements against a threshold value. The program instructions can also return, using the processor, data meeting the search query elements and having a score for their developer meeting the threshold value to users that provided the search inquiry. In some embodiments, the data being searched is source code, e.g., source code stored in a source code repository.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Figure 1:
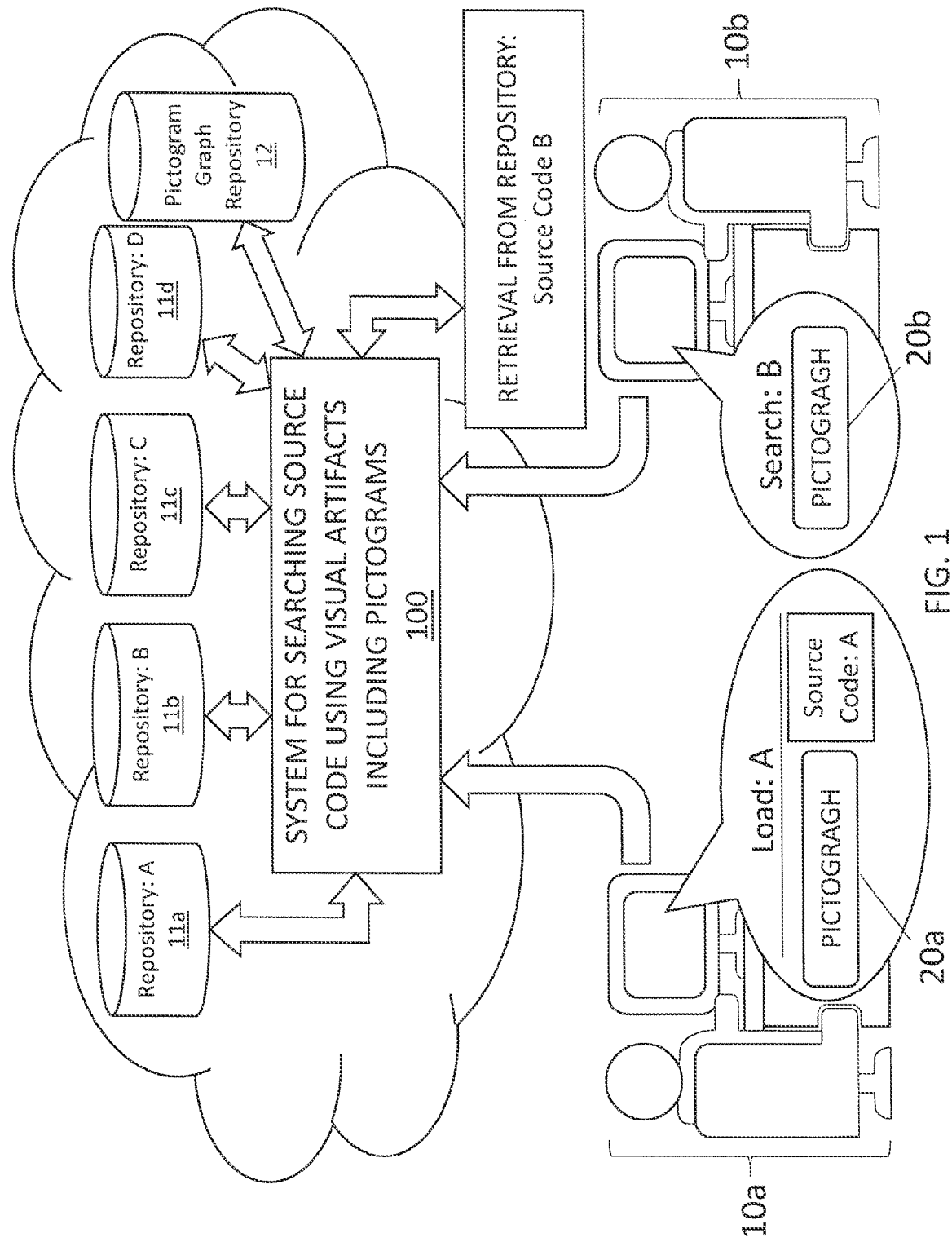
FIG. 1 is a diagram illustrating an exemplary environment, where a system is used for employing visual artefacts including pictograms to search source code, in accordance with one embodiment of the present disclosure.

The methods, systems and computer program products described herein are directed to managing databases of source code and/or searching source code. A source-code repository is a file archive and web hosting facility for source code of software, documentation, web pages, and other works, accessible either publicly or privately. The availability of voluminous source code repositories, can present a challenge because it can take a significant amount of effort in identifying the most suitable source code for reuse owing to a number of reasons. For example, a fundamental approach to application development is via design followed by the development phase. There can be a lot of time and effort spent in creating, reviewing and updating associated artifacts. An "artifact" is a by-product of software development. It's anything that is created so a piece of software can be developed. This might include things like data models, diagrams, setup scripts.

There is also a break in continuity between development of an artifact and how it is described in a repository. For example, a developer comes up with a diagram for software, however when it comes to searching for code he/she uses keywords (e.g., text). In this instance, to identify the developers software, a consumer needs to browse through the content, e.g., program, script etc., and verify whether the code matches the need of the consumer.

In contrast to methods that use text-based search engines to look up source code, the methods, systems and computer program products of the present disclosure employ visual artefacts to search for matching repositories. In some embodiments, the methods, systems and computer program products can provide at visual type of artefact for the representation of objects and operations that represent the source code. The visual type of artefact can include a pictogram type representation. A "pictogram", also called a pictogramme, pictograph, or simply picto, includes computer usage of an icon, and is a graphic symbol that conveys its meaning through its pictorial resemblance to a physical object. In some embodiments, the visual artefact can include a combination of symbols for objects and operations in all domains from standards bodies, such as International Organization for Standardization (ISO), American Society of Mechanical Engineers standard (ASME), the Institute of Electrical and Electronics Engineers Standards (IEEE), American National Standards Institute (ANSI), etc. In some scenarios, the universe of pictograms covers an exhaustive base spread across most industries. In contrast to methods that use text-based search engines to look up source code, the methods, systems and computer program products, use visual artifacts, e.g., pictograms, configured into pictogram source code graphs to search for matching repositories. The methods, systems and computer program products that employ pictogram source code graphs avoid the obfuscation of esoteric symbolic languages that take myriad forms in program language C to program language Java to program language Python to thousands of others. Not only can all of them become pictogram source code graphs but it will be agnostic to the native language of the coder, i.e., geography language nuances, e.g., he/she originates from Japanese or Ethiopian or English. The methods, systems and computer program products that provide for using visual artefacts including pictograms to search source code are now described with greater detail with reference to FIGS. 1-11. It is noted that although the methods and systems described herein refer to searching to source code, the present disclosure is not limited to only this example, as other forms of data stored on forms of memory can be searched using the pictogram based search concepts described herein.

Figure 2:
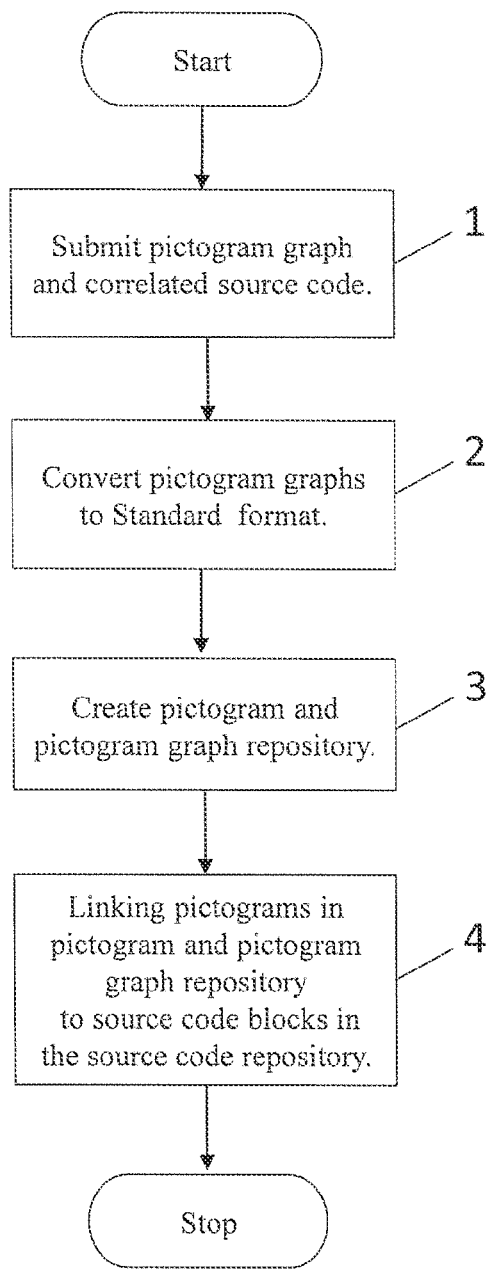
FIG. 2 is a flow chart/block diagram illustrating a method that employs visual artefacts including pictograms to create a repository of pictogram and pictogram graphs mapped to source code blocks stored in source code repositories, in accordance with one embodiment of the present disclosure.
Figure 3:
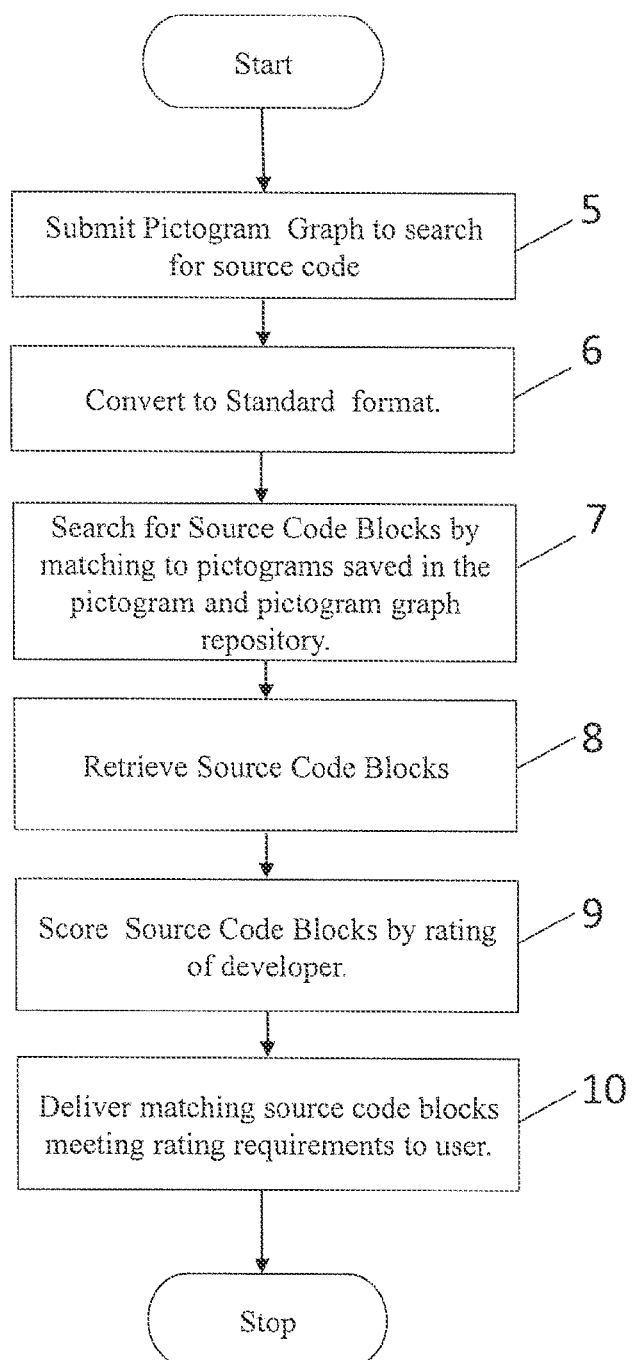
FIG. 3 is a flow chart/block diagram illustrating a method that employs visual artefacts including pictograms to search source code repositories for source code, in accordance with one embodiment of the present disclosure.
Figure 4:
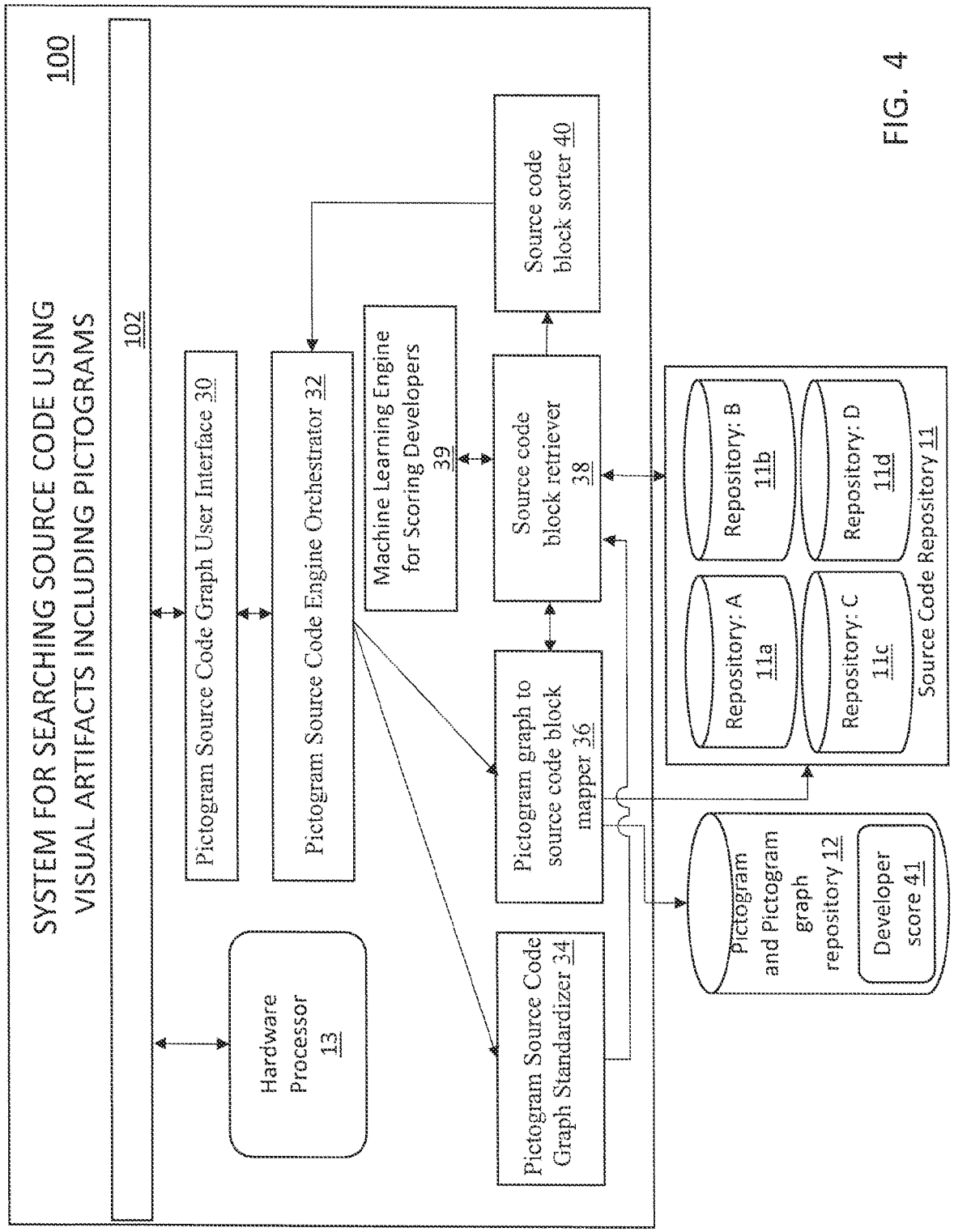
FIG. 4 is a block diagram of a system illustrating a that employs visual artefacts including pictograms to search source code, in accordance with one embodiment of the present disclosure.

FIG. 1 an exemplary environment, where a system is used for employing visual artefacts including pictograms to search source code. FIG. 2 is a flow chart/block diagram illustrating a method that employs visual artefacts including pictograms to create a repository of pictogram and pictogram graphs mapped to source code blocks stored in source code repositories. FIG. 3 illustrates one embodiment of a method that employs visual artefacts including pictograms to search source code. FIG. 4 illustrates one embodiment of a system that employs visual artefacts including pictograms to search source code, which in some embodiments may be employed with the method described in FIGS. 2 and 3.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 is a diagram illustrating an exemplary environment, where a system 100 is used for employing visual artefacts including pictograms to search for source code on search code repositories 11a, 11b, 11c, 11d. As will be described in further detail with reference to FIG. 4, the system 100 may include a pictogram source code graph user interface 30, a pictogram source code engine orchestrator 32, a pictogram source code graph standardizer 34, a pictogram graph to source code block mapper 36, a source code block receiver 38, and a source code block sorter 40. The system 100 may be implemented through a network that may include a cloud computing environment 150. The cloud computing environment 150 may includes one or more cloud computing nodes with which local computing devices used by cloud consumers, such as, for example, personal digital assistant (PDA) or cellular telephone, desktop computer, laptop computer, and/or automobile computer system may communicate. Nodes may communicate with one another.

Referring to FIGS. 1 and 4, in one embodiment, a user 10a that is uploading new source code, e.g., Source code: A, for storage on a source code repository, e.g., Repository: A 11, may interact with the system 100 through the pictogram graph user interface 30. The user 10a may be uploading source code to a file repository to be accessed by other parties for use. In some embodiments, the pictogram graph user interface 30 functions as a web portal or the user interface through which a user 10a interacts via the user interface (UI) of a computer, e.g., desktop computer/workstation, and/or the user interface (UI) of a mobile device, to contribute new pictogram graphs that are correlated to source code blocks to be stored on the repositories. In one example, to have source code stored on a file repository, e.g., Repository: A 11a, Repository: B 11b, Repository: C 11c, and Repository: D 11d, the user provides to the system 100 both the source code, e.g., Source code A, that they want to store, and a pictogram graph 20a corresponding to the content of the source code. In some embodiments, by content of the source code it is meant the function that is provided by the source code when used by a computer to provide an operation. For example, source code could be a program to run a pump, e.g., a program to stop a pump from pumping water into a reservoir once the water level within the reservoir reaches a specific level, e.g., target water level. This is only one example of a type of source code that can be identified using a pictogram graph 20a. The pictogram graph 20a depicted in FIG. 1 is magnified in FIG. 5. Once the source code, e.g., Source Code A, and the associated pictogram source code graph 20a is received by the system 100, the system 100 can then store the source code in an appropriate repository, e.g., Repository: A 11a, with the appropriate designations discoverable by search methods using pictograms.

As will be discussed with greater detail with reference to FIGS. 2-4, the interaction of the user 10a with the system 100 can employ a pictograph graph to source code blocks mapper 36 to establish a pictogram and pictogram graph repository 12 that is mapped to source code blocks in a plurality of source code repositories 11, e.g., Repository: A 11a, Repository B 11b, repository 11c and repository 11d. By creating the pictogram and pictogram graph repository 12 that is mapped to the source code blocks stored in the source code repository 11, the users 10a build a classification system that can be used to search for source code using pictograms as search terms instead of text.

Referring to FIG. 1, in another use case, a user 10b is searching for new source code, e.g., Source code: A, that may be storage on a source code repository, e.g., Repository: A 11. In this use case, a pictogram and pictogram graph repository 12 has been created that is mapped to the source repository 11. The correlation, e.g., mapping, between the pictogram and pictogram graph repository 12 and the source repository 11 is used for searching using pictograms, e.g., pictogram graphs 20b, as search queries instead of text. In one embodiment, the user 10b is searching for blocks of source code, e.g., source code B, that is stored in the plurality of source code repository 11, e.g., Repository: A 11a, Repository B 11b, repository 11c and repository 11d. The user 10b enters a pictograph graph 10b including pictograms arranged to correlate to the subject matter for which the user 10b desires to locate in the repositories and retrieve appropriate source code, e.g., source code block, such as source code B.

In this use case, the user 10b may interact with the system 100 through the pictogram graph user interface 30. In this scenario, the user 10b may enter into a data entry field, e.g., data entry field of a search engine interface, a pictogram graph correlated to the characteristics of source code the user 10b desires to locate. The pictogram graph user interface 30 can also function for the interface through which a user searches for source code blocks, e.g., source code b, on the source code repository 11. In this use case, the user 10b would enter a pictogram graph 20b that is selected for the purposes of matching a pictogram e graph corresponding to source code that is stored on the source code repository meeting the description of the content for which the user is searching.

As will be described with greater detail with reference to FIGS. 2-4, the system 100 employs a pictogram source code graph standardizer 34 to convert the pictogram graphs 20a, 20b into a text based format, e.g., extensible markup language (XML) format. The converted data would then be used by a source code block receiver 38 to match to pictograms from the pictogram and pictogram graph repository 12 and correlated source code blocks from the source repository 11 using the relationships maintained with the pictogram graph to source code block mapper 36.

In some embodiments, the matching source code, e.g., source code B, is checked by how the developer for that software has been scored. Referring to FIGS. 2-4, the system 100 may include a machine learning engine for scoring developers 39 that checks the retrieved blocks of source code to determine whether the developer that created the source code block is highly rated for providing source code that operates in its intended manner. Based on a recorded score for the developer, and a baseline for performance that qualifies a developer for providing source code suitable for retrieval in response to a search inquiry, the machine learning engine for scoring developers 39 delivers source code meeting the scoring requirements to the source code block receiver 38, which in turn returns source code, e.g., source code B, back to the user 10b making the search.

Figure 5:
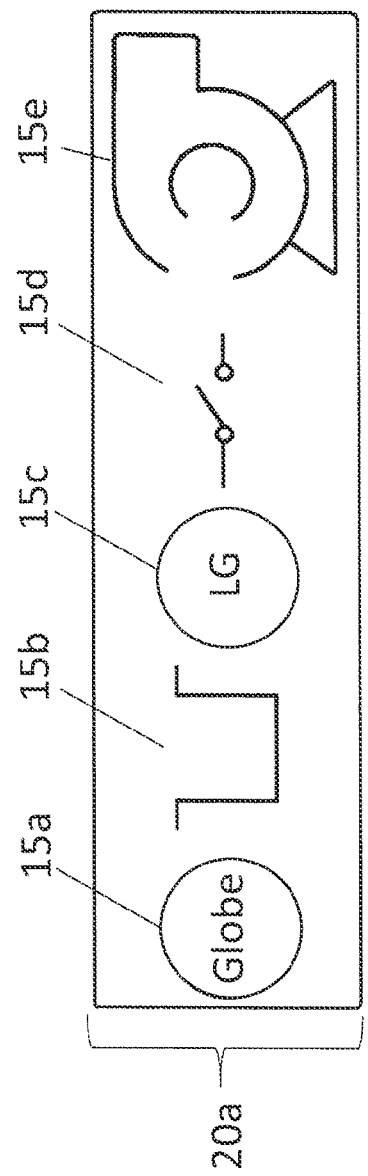
FIG. 5 is an illustration of a pictogram graph that represents "stop pump on detection of target water level", in accordance with one embodiment of the present disclosure.

The method that employs visual artefacts including pictograms to search source code, may begin with building a source code repository 12. FIG. 2 illustrates one embodiment of a method that employs visual artefacts including pictograms to create a repository of pictogram and pictogram graphs 12 mapped to source code blocks stored in source code repositories 11. FIG. 5 illustrates one embodiment of a pictogram graph 20a that is composed of a plurality of pictograms 15a, 15b, 15c, 15d, 15e.

Block 1 of the method depicted in FIG. 2 can include submitting pictogram graphs 20a, and correlated source code. As described with reference to FIG. 1, the submission of the pictogram graphs 20a and the correlated source code to the system 100 may be by a source code developer desiring to store the source code on a source code repository 11 for access by other parties.

The user 10a submits the blocks of source code they are looking to contribute, e.g., source code A, and a pictograph graph 20a including pictograms 15a, 15b, 15c, 15d, 15e configured to provide designating data for the block of source code so that the source code can be identified and selected during searches of the source code repositories, e.g., 11a, 11b, 11c, 11d.

Referring to FIG. 4, the user 10a can submit the pictograph graphs 20a, and the source code to the pictogram graph interface 30 of the system 100. The pictogram graph interface 30 may be a web portal or desktop/mobile device client user interface (UI) for contributing the new source code pictogram graphs to the pictogram and pictogram graph repository 12. In some instances, the pictogram graph interface 30 may provide an output to the user 10a, when the submitted source code, e.g., source code A, and pictogram graph, e.g., pictogram graph 20a, is successfully uploaded to the pictogram and pictogram graph repository 12, and the associated source code blocks are uploaded to a repository.

Block 2 of the method for generating the pictogram and pictogram graph repository 12 and correlated source code may include converting the pictogram graph 20a to a standard language, such as a text based language. For example, the pictogram graph 20a may be converted into a text based program language, such as XML. In some embodiments, converting the pictograms into a pictogram source code graph includes Extensible Markup Language (XML) format to enable processing. Extensible Markup Language (XML) is a markup language that defines a set of rules for encoding documents in a format that is both human-readable and machine-readable.

Referring to FIG. 4, in some embodiments, the system 100 can provide the conversion using a pictograph source code group standardizer 34. The pictograph source code group standardizer 34 can provide a way of processing an input pictograph and using a standard rule set to produce a representative XML file. The pictograph source code group standardizer 34 may include at least one hardware processor for executing instructions stored in a form of memory, in which the instructions when executed can convert a visual artifact or symbol to text correlated with the symbol. In some embodiments, the pictograph graphs include images only, and does not include text. The pictogram graphs may have a meaningful sequence, but is not a process flow diagram. In some embodiments, the pictogram graphs do not require connectors between pictograms. Pictogram sequences can run indefinitely, i.e., within the limits of computer processing. Pictogram sequences can branch in and out.

In some embodiments, the pictograms may be selected from standardizing bodies, such as International Organization for Standardization (ISO), American Society of Mechanical Engineers standard (ASME), the Institute of Electrical and Electronics Engineers Standards (IEEE), American National Standards Institute (ANSI), etc. By employing pictograms from the standardizing bodies, a meaning has already been associated with the pictogram. This can facilitation the conversion of the pictogram graphs (examples 20a, 20b, 20c in FIGS. 5-7) to an XML file.

Referring back to FIG. 2, the method may continue to block 3. Block 3 includes creating the pictogram and pictogram graph repository 12 (depicted in FIG. 4). Following the conversion of pictograms to a standardized language, such as XML, the pictogram graph data is stored in a repository 12. The pictogram graph data includes data correlating the standardized language to pictograph images, as well as the location of source code matches in the plurality of source code repositories 11, e.g., Repository: A 11a, Repository: B 11b, Repository: C 11c, and Repository: D 11d. Referring to FIGS. 1 and 4, the pictogram and pictogram graph repository 12 may be stored using a cloud storage environment. The pictogram and pictogram graph repository can store user 10a contributed pictograms, e.g., source code developer contributed pictograms, as well as standard pictograms defined by existing standards. The stored data for the pictograms (and pictogram graphs) can be tagged with a referential key when source code blocks exists for the pictogram (and pictogram graphs). In some embodiments, when a user 10a has uploaded source code specific pictogram (pictogram graphs) to the source code and source code graph repository 12, the repository 12 may provide an output of a successful upload that is communicated to the user 10a through the pictograph source code graph interface 30 of the system 100.

In some embodiments, the method in FIG. 2 may further include linking programs to source code blocks in the source code repositories 11, e.g., Repository: A 11a, Repository: B 11b, Repository: C 11c, and Repository: D 11d, with the pictograms in the pictogram and pictogram repository 12 at block 4. In some embodiments, after creating the repository of pictograms and pictogram graphs 12, the method may further include maintaining a relationship between the pictograms and/or pictogram graphs 20a and source code blocks that are stored in the source code repositories 11.

Referring to FIG. 4, in some embodiments, a pictogram graph to source code block mapper 36 maintains the relationship between the pictograms and/or pictogram graphs 20a and source code blocks that are stored in the source code repositories 11. The pictogram graph to source code block mapper 35 can deduplicate and positions contributed pictogram graphs and source code blocks into their respective repositories, e.g., the repository for the pictogram and pictogram graphs 12, and the source code repositories 11, respectively. The pictogram graph to source code block mapper 35 can map pictograms from the pictogram and pictogram graph repository 12 to source code blocks in the source code repositories 11.

The method described with reference to FIG. 2 may provide one embodiment of a use case in which a user 10a is uploading source code that is associated with pictograms and pictogram graphs to be stored on a source code repository 11, and to be retrieved by other parties searching for source code on the source code repositories 11 with search engines that employ pictograms and/or pictogram graphs for search inquiries instead of using search terms (e.g., search text).

FIG. 3 illustrates a method that employs visual artefacts including pictograms to search for source code, e.g., source code blocks, in source code repositories 11. FIG. 4 illustrates one embodiment of a system 100 that can be utilized with the method in FIG. 4 for using pictograms to search for source code, e.g., source code blocks, in source code repositories 11. In some embodiments, the method depicted in FIG. 3 may employ the pictogram and pictogram graph repository 12 that is created (also referred to as built) in accordance with the method described in FIG. 2.

Figure 7:
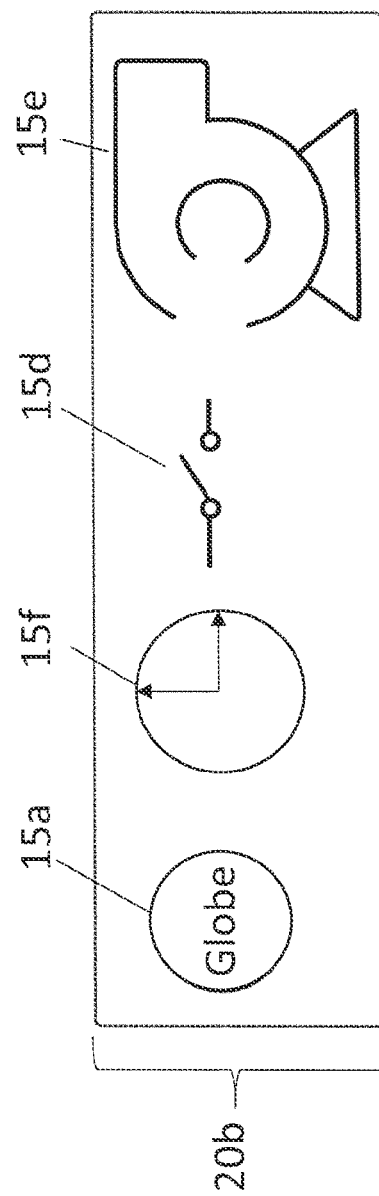
FIG. 7 is another example of a pictogram graph that represents "stop pump on detection of target water level", in accordance with one embodiment of the present disclosure.
Figure 6:
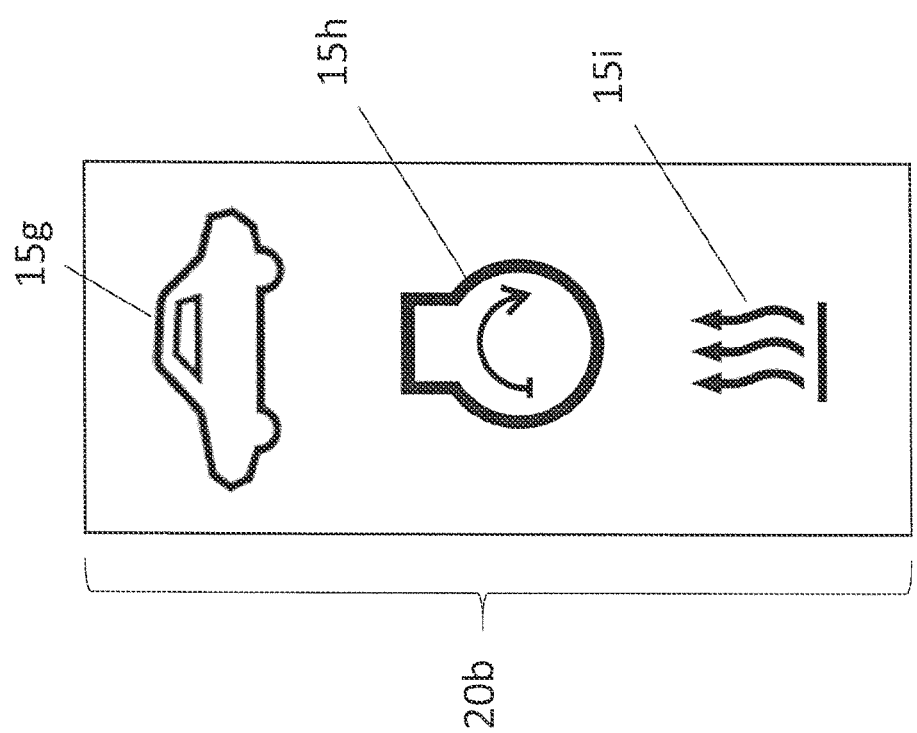
FIG. 6 is another example of a pictogram graph, in which the pictogram source code graph includes pictograms for "car", "engine start" and "interior heating", in accordance with one example of the present disclosure.

Referring to block 5 of FIG. 3, the method may include submitting pictogram graphs to search for source code. Block 5 includes submitting visual artefacts, e.g., pictograms 15a, 15b, 15c, 15d, 15e, 15f, 15g, 15h, 15i to the system 100, that is used for searching source code. Examples of pictograms 15a, 15b, 15c, 15d, 15e, 15f, 15g, 15h, 15i are depicted in FIGS. 5-7. Referring to FIG. 5, the pictograms 15a, 15b, 15c, 15d, 15e are arranged into pictogram source code graph 20a. The representation of the pictogram source code graph 20a that is depicted in FIG. 5 is an example of a representation of the expression "stop pump on detection of target water level". This expression for characterizing source code and/or source code blocks that can be provided by a user 10a uploading source code so that the expression (e.g., sequence of pictograms 15a, 15b, 15c, 15d, 15e) is saved in the pictogram and pictogram graph repository 12, which allows for searches to locate the source code from the repository on which it is saved using substantially matching pictogram searches. This expression (pictogram graph 20a) can also be used by a user 10b searching source code repositories 11, 11a, 11b, 11c, 11d for source code.

In FIG. 5, the pictogram 15a is in indication of a region (location) in which the program is applicable. Pictogram 15b indicates a vessel to be filled. Pictogram 15c indicates a measurement of the vessel being filled to its maximum capacity. Pictogram 15d is a switch that is to be turned off when the vessel reaches maximum fill. Pictogram 15e indicates the pump that is turned off, i.e., stops pumping, when the switch is turned off as the vessel is completely filled. It is noted that this is only one example of a series of pictograms being employed in a pictogram graph 20a. Each pictogram source code graph 20a, 20b 20c (examples depicted in FIG. 5-7) can represent an operation performed by an object. In some embodiments, there will be no actions without object or objects without actions (even if the objects are inanimate, they are assumed to be able to perform actions, such as "falling", "rolling", "hitting", disintegrating", etc. Considering the number of pictograms available, the pictogram source code graphs 20a, 20b, 20c and assemblies thereof can represent virtually any and all source code that has been developed.

In the example depicted in FIG. 6, pictograms are provided for a "car" 15g; the operation of "engine start" 15h; and the operation of "interior heating" 15i. The pictograms 15g, 15h, 15i can be arranged in a pictograph source code graph 20c that conveys a source program, or a search inquiry for source code blocks, that turns on interior climate control for a vehicle after the engine is started.

In some embodiments, there can be four aspects to consider in computational logic for employing visual artefacts including pictograms to search source code, which can include objects, their states, location and time. The four aspects can be represented in every finite-state sequence pictogram. As the methods, systems and computer program products described herein represent and discover computation patterns, and not to represent the actual code, the pictograms will be logical representations and not physical representations of states.

FIGS. 5 and 7 depict a set of embodiments for a pictogram source code graph that represents "stopping a pump". FIG. 5 is an example representing the starting of a pump followed by the detection of the fluid level of a reservoir and switching off. Note that the pictogram graph 20b depicted in FIG. 7 has a time symbol, i.e., pictogram 15f, indicating that there is a time element to this automaton, whereas the pictogram graph 20a depicted in FIG. 5 does not have it, indicating that it can happen at any time. Instead, the Both pictogram source code graphs depicted in FIGS. 5 and 7 show the earth symbol 15a to indicate that there is a location element to both states, and the source programming is for use somewhere within the planet and not somewhere else in the universe, e.g., mars and/or the moon). In the pictogram graph 20b depicted in FIG. 7, the symbols are, from left to right, earth 15a, clock 15f, on-off switch 15d, and centrifugal pump 15e. In the pictogram graph depicted in FIG. 5, the symbols are, earth 15a, open tank 15b, level gauge 15c, on-off switch 15d, and centrifugal pump 15e.

Referring to FIG. 4, the user 10b can submit the pictograph graphs 20a for searching for source code to the pictograph source code graph interface 30 of the system 100. The pictograph source code graph interface 30 may be a web portal or desktop/mobile device client user interface (UI).

Referring to FIG. 4, in some embodiments, the method may include submitting visual artefacts, i.e., pictograms, to the system 100 for employing visual artefacts including pictograms to search source code, at block 5, and converting the visual artefacts including the pictograms from a pictogram source code graph 20a, 20b, 20c to a standard format at block 6. Block 6 of the searching method (the use case by the user 10b that is searching for source code by using pictogram graphs 20a, 20b, 20c as search elements in a search engine (similar to search text), which includes converting the pictogram graphs 20c to a standard language, e.g., text based language, is similar to the conversion that is described above with reference to block 2 of FIG. 2.

Figure 8:
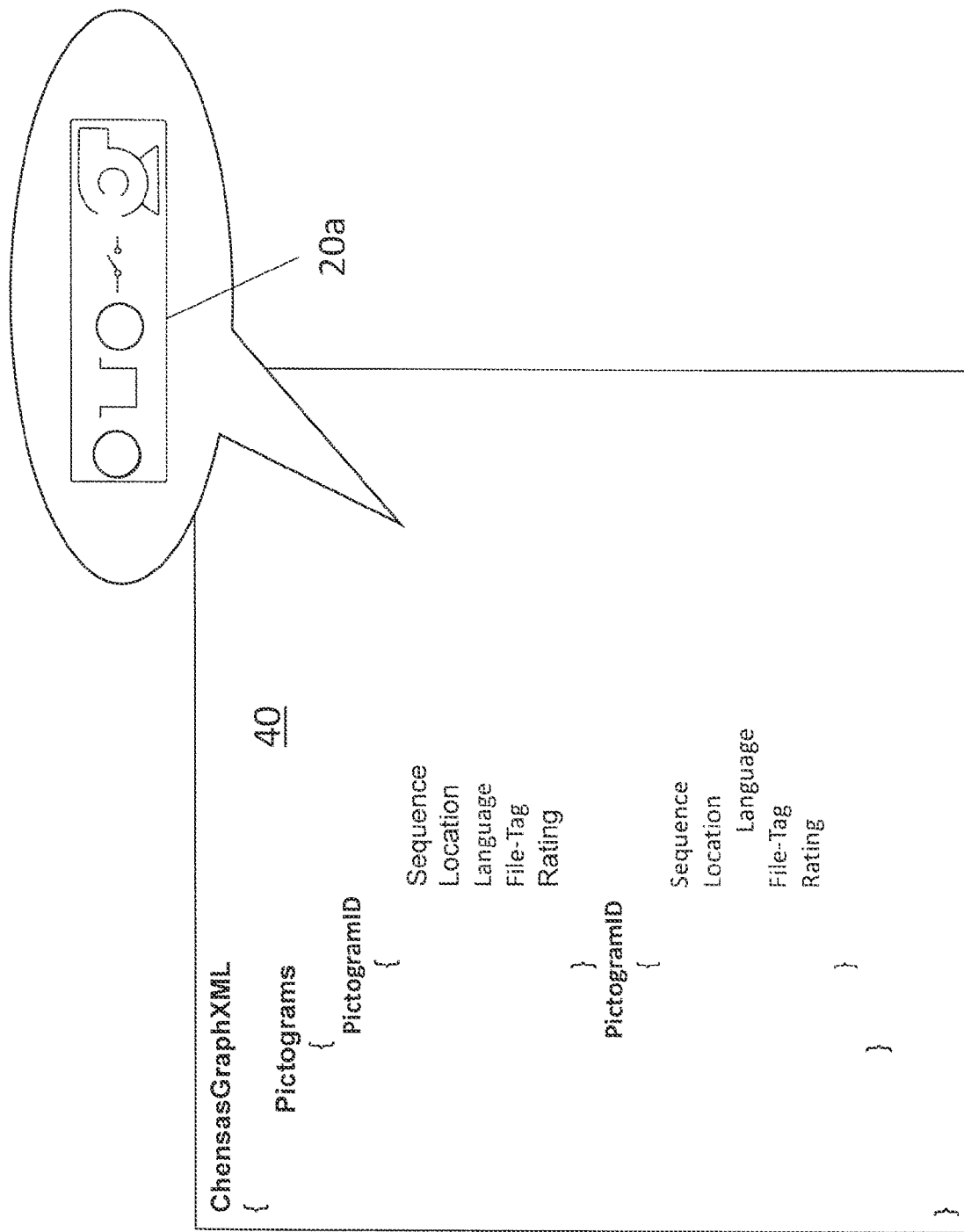
FIG. 8 illustrates one example of converting a pictogram source code graph to Extensible Markup Language (XML) format text.

FIG. 8 illustrates one example of converting the pictogram source code graph, e.g., a pictogram graph 20a similar that to the pictogram graph depicted in FIG. 5, that includes Extensible Markup Language (XML) format 40 to enable processing at block 6 of the method that is depicted in FIG. 3. The depiction in FIG. 8 is also applicable to block 2 of the method depicted in FIG. 2. The conversion of the pictogram source code graph to XML format can include information for a sequence, location, file-tag and a rating. The sequence is the order/position of the different pictographs in the pictogram source code graph. The order of the different pictographs are data that convey content in addition to the individual pictographs. For example, in the source code graph depicted in FIG. 5, the sequence from left to right may include earth 15a, open tank 15c, level gauge 15c, switch 15d and pump 15e. The destination may be an identifier for the source code repository. The language data for the pictogram source code graph may include a software language, e.g., program language C, C+, Python, Java, etc. The file-tag information specifies the file and pictogram object location based on tags, e.g., 1.java-Switch. The rating information can specify a rating for the source code based upon user feedback based upon relevance, e.g., H/M/L (highly (H) rated/medium (M) rated/low (L) rated).

Similar to block 2 of FIG. 2, for searching and retrieval of source code from source code repositories 11 using pictogram graphs as search elements, and the step of converting the pictogram graphs to a text based language, may include the pictograph source code group standardizer 34 of the system depicted in FIG. 4. The pictograph source code group standardizer 34 can provide a way of processing an input pictograph and using a standard rule set to produce a representative XML file.

Referring back to FIG. 3, at block 7 the method may further include using the pictogram source code graph 20a, 20b, 20c to search repositories 11 of source code, e.g., Repository: A 11a, Repository: B 11b, Repository: C 11c, and Repository: D 11d. In this example, the repositories of source code contains a mapped pictogram source code graph to blocks of source code. As described in the method illustrated in FIG. 2, the mapping of previously submitted pictogram graphs, which can be stored in the pictogram and pictogram graph repository 12, with the relevant source code blocks stored in the repositories 11 can be provided through the pictograph source code group standardizer 34 of the system 100 that is depicted in FIG. 4.

At block 8 of FIG. 3, the method further includes retrieving source code blocks. The step of retrieving source code blocks identified through search methods for searching for source code using pictograms as the entity to identify search criteria for source code may employ the source code block retriever 38 of the system 100 that is depicted in FIG. 4. The source code block retriever 38 matches the pictograms and pictogram graphs that were entered into the pictogram source code graph user interface 20 by the user 10b that is conducting the search with the mapped pictograms and pictogram graphs saved within the pictogram repository 12 as maintained by the pictogram graph to source code block mapper 36. Matching source code, e.g., source code blocks, are identified and their content retrieved by the source code block retriever 38 for consideration of their scoring.

The matching function of the source code block retriever 38 may be provided by a software module represented as a state change machine. A "state change machine" may include a finite number of states (also referred to as m-configurations) which it switches between on every iteration. In the present case, the pictograms of the pictogram graphs (examples including the pictogram graphs 20a, 20b, 20c depicted in FIGS. 5-7) entered by the users 10b conducting pictogram based searches for software code and the pictograms in the pictogram repository 12 mapped to the source code in the source code repository 11 represent the finite states. The state change machine may switch between the finite states until matches are determined. The state change machine may function as a Turing complete machine. The Turing complete machine can be able to represent faithfully all pushdown, finite states, sequential logic and combinational logic.

At block 8, in some embodiments, the method of searching for source code using pictograms as the entity to identify search criteria for source code may continue with retrieved results from the repositories of source code being returned to the developer in the form of source code blocks at block 6.

Referring to FIG. 4, when pictogram graphs from the search query match pictogram graph data in the pictogram repository 12, the source code block retriever 38 performs a scoring check operation. This may include machine learning that establishes a threshold for effective searches for source code based upon a rating system for the developers that Referring to block 9 of the method depicted in FIG. 3, following matching/retrieval of source code/source code blocks meeting the search query of the user 10b, the matching source code is checked for its score. At block 9, the method may include using machine learning to improve the accuracy of the search results. "Machine learning" is a method of data analysis that automates analytical model building. It is a branch of artificial intelligence based on systems learning from data, identifying patterns and make decisions with minimal human intervention. Machine learning employs statistical techniques to give computer systems the ability to "learn" (e.g., progressively improve performance on a specific task) with data, without being explicitly programmed. The machine learning method that can be used to increase the accuracy of the source code searches using the pictogram source code graphs 10 can include decision tree learning, association rule learning, artificial neural networks, deep learning, inductive logic programming, support vector machines, clustering analysis, bayesian networks, reinforcement learning, representation learning, similarity and metric learning, sparse dictionary learning, genetic algorithms, rule-based machine learning, learning classifier systems, and combinations thereof. The remote predictive light setting computing system using machine learning produces a model for providing predictive light characteristics in response to environmental inputs, such as time, weather and calendar date may include a machine learning algorithm that can be selected from the group consisting of: Almeida-Pineda recurrent backpropagation, ALOPEX, backpropagation, bootstrap aggregating, CN2 algorithm, constructing skill trees, dehaene-changeux model, diffusion map, dominance-based rough set approach, dynamic time warping, error-driven learning, evolutionary multimodal optimization, expectation-maximization algorithm, fastICA, forward-backward algorithm, geneRec, genetic algorithm for rule set production, growing self-organizing map, HEXQ, hyper basis function network, IDistance, K-nearest neighbors algorithm, kernel methods for vector output, kernel principal component analysis, leabra, Linde-Buzo-Gray algorithm, local outlier factor, logic learning machine, LogitBoost, manifold alignment, minimum redundancy feature selection, mixture of experts, multiple kernel learning, non-negative matrix factorization, online machine learning, out-of-bag error, prefrontal cortex basal ganglia working memory, PVLV, Q-learning, quadratic unconstrained binary optimization, query-level feature, quickprop, radial basis function network, randomized weighted majority algorithm, reinforcement learning, repeated incremental pruning to produce error reduction (RIPPER), Rprop, rule-based machine learning, skill chaining, sparse PCA, state-action-reward-state-action, stochastic gradient descent, structured kNN, T-distributed stochastic neighbor embedding, temporal difference learning, wake-sleep algorithm, weighted majority algorithm (machine learning) and combinations thereof.

Referring to block 9, a developer that has contributed source code meeting the requirements of a number of searches and successfully functioning for their searched function will be rated highly, e.g., receiving a rating of high (H). A developer that has failed to contribute meaningful source code/source code blocks will receive a poor score, e.g., be scored as low (L). A developer that is scored as low (L) has not uploaded source code/source code blocks that have been significantly retrieved and/or the source code retrieved has not met the expectation for the search criteria. Developers may also be scored as medium (M). Referring to FIG. 4, the score for the developers may be stored in a developer score module 41 of the pictogram and pictogram graph repository 12.

In some embodiments, a user 10b may enter ratings for developers of retrieved source code/source code blocks into the pictograph source code graph interface 30 of the system 100. The ratings are stored in the repository 12 for pictograms and pictogram graphs. Similar to how the pictograms/pictogram graphs submitted by users 10a (e.g., developers) are mapped to source code/source code blocks, the ratings provided by the users 10b (users conducting searches and receiving source code/source code blocks) for the developers is mapped to the source code/source code blocks.

The pictograph source code graph interface 30 of the system 100 allows for search users 10b to provide a rating for the search outcomes (i.e. source code blocks) at multiple levels. At the macro level, the rating for the developer may be assigned by the user 10b for the source code blocks retrieved in response to an entire pictogram graph. At the micro level, the rating for the developer may be assigned by the user 10b for the source code blocks retrieved in response to a portion of the pictogram graph, such as a single pictogram.

It is noted that in some embodiments, the user 10a that is uploading source code, e.g., developer, is not setting a rating for himself. However, embodiments have been contemplated, in which the user 10a can also rate the source code/source code blocks that they are uploading for storage on the source code repositories 11, as well as for retrieval in response to searches.

In some embodiments, the ratings for the outcome of searches (and downloaded code) can be rated to arrive at a relevance score using computation mechanisms e.g. average. This score can be computed by the source code block retriever 38. A threshold for a minimum value can be set for a developer score, in which any source code contributed by a developer (user 10a) having a score greater than the minimum value could provide source code blocks to be retrieved in response to search queries from the users 10a. The establishment of the minimum threshold can be provided by the Machine Learning Engine for Scoring Developers 39 of the system depicted in FIG. 4. The machine learning engine for scoring developers 39 can review the retrieved source code, check the score of the retrieved source code by developer score and then determine if the score for the developer stored in the developer score repository 41 and matched to the source code blocks meets the minimum threshold.

The use of machine learning can improve the search accuracy, mapping accuracy, can establish a threshold (configurable) to deprecate/delete the mapping (Chensas Graph/Pictogram+(associated) Source Code), and can identify a higher ranked mapping for source code blocks matching a pictogram graph entered as a search query by a user 10a.

Referring to FIGS. 3 and 4, the retrieved source code meeting scoring requirements for its reliability and quality is returned to the users 10b. The location (of the source code by identifying relevant source code repositories 11 storing the source code) located by the search based on the pictograms in the pictogram source code graphs 20 may be provided to the users 10b. The search results and the location of the source code can be reported to the user 10b through the pictograph source code engine orchestrator 32 and ultimately to the pictograph source code graph interface 30.

FIG. 4 is a block diagram of a system 100 that employs visual artefacts including pictograms to search source code. The system 100 may include a pictogram source code graph user interface 20, a pictogram source code engine orchestrator 25, a pictogram source code graph standardizer 30, a pictogram graph to source code block mapper 35, a source code block receiver 40, and a source code block sorter 45. The pictograph source code engine orchestrator evaluates the inputs and determines whether the system 100 should operate in a process flow that provides for uploading source code to a source code repository 11 or for searching source code repositories for source code blocks. The elements of the system depicted in FIG. 4 are described in further detail with respect to the environment depicted in FIG. 1, and the methods described with reference to FIGS. 2 and 3.

In one embodiment, a system 100 for searching stored data using pictograms as search query elements is provided that includes a hardware processor 13, and a memory that stores a computer program product. The computer program product stored on the memory when executed by the hardware processor, causes the hardware processor 13 to create a pictogram repository of pictograms including expressions that are mapped to at least a portion of data that is stored in a separate data repository. The system can also record a score for developers for the at least the portion of data that is stored in the data repository. In some embodiments, the system causes the hardware processor 13 to receive a search inquiry including at least one pictogram for search query elements. The at least one pictogram for the search query elements is matched to the pictograms in the repository of pictograms that includes expressions that are mapped to at least a portion of data that is stored in the separate data repository. The system also causes the hardware processor 13 to check the development score for the matched data from the pictograms in the repository of pictograms corresponding to the at least one pictograms for search query elements against a threshold value. The system can also retrieve data meeting the search query elements and having a score for their developer meeting the threshold value to users that provided the search inquiry. In some embodiments, the data being searched is source code, e.g., source code stored in a source code repository.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention.

Figure 9:
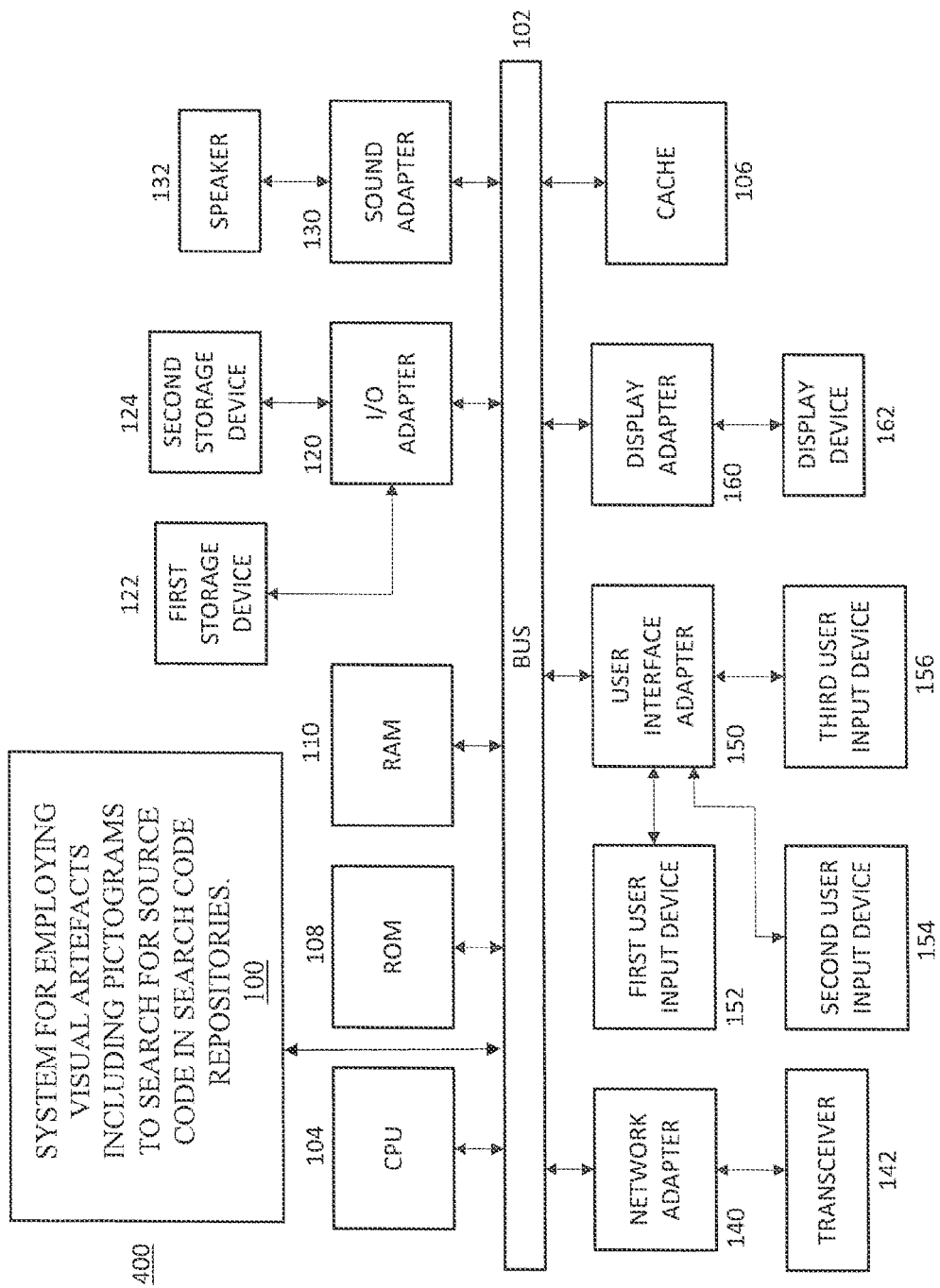
FIG. 9 is a block diagram illustrating a system that can incorporate the system that employs visual artefacts including pictograms to search source code that is depicted in FIG. 4, in accordance with one embodiment of the present disclosure.

FIG. 9 is a block diagram illustrating a process system 400 that can incorporate the system 100 that employs visual artefacts including pictograms to search source code that is depicted in FIG. 4. FIG. 9 depicts one embodiment of an exemplary processing system 400 to which the present invention may be applied is shown in accordance with one embodiment. The processing system 400 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102. As illustrated, the system 100 that employs visual artefacts including pictograms to search source code can be integrated into the processing system 400 by connection to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 400.

Of course, the processing system 400 may also include other elements (not shown), as readily contemplated by one of skill in the art, as well as omit certain elements. For example, various other input devices and/or output devices can be included in processing system 400, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 400 are readily contemplated by one of ordinary skill in the art given the teachings of the present invention provided herein.

The present invention may be a system, a method, and/or a computer program product at any possible technical detail level of integration. For example, in some embodiments, a computer program product is provided for using pictograms as search query elements. The computer program product includes a computer readable storage medium having computer readable program code embodied therewith. The program instructions executable by a processor to cause the processor to create, using the processor, a pictogram repository of pictograms including expressions that are mapped to at least a portion of data that is stored in a separate data repository. The program instructions can also record, using the processor, a score for developers for the at least the portion of data that is stored in the data repository. In some embodiments, the program instructions include to receive, using the processor, a search inquiry of at least one pictograms for search query elements. The at least one pictogram for the search query elements are matched to the pictograms in the repository of pictograms that includes expressions that are mapped to at least a portion of data that is stored in the separate data repository. The program instructions can also check, using the processor, the score of the developer for the matching data from the pictograms in the repository of pictograms corresponding to the at least one pictograms for search query elements against a threshold value. The program instructions can also return, using the processor, data meeting the search query elements and having a score for their developer meeting the threshold value to users that provided the search inquiry. In some embodiments, the data being searched is source code, e.g., source code stored in a source code repository.

The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
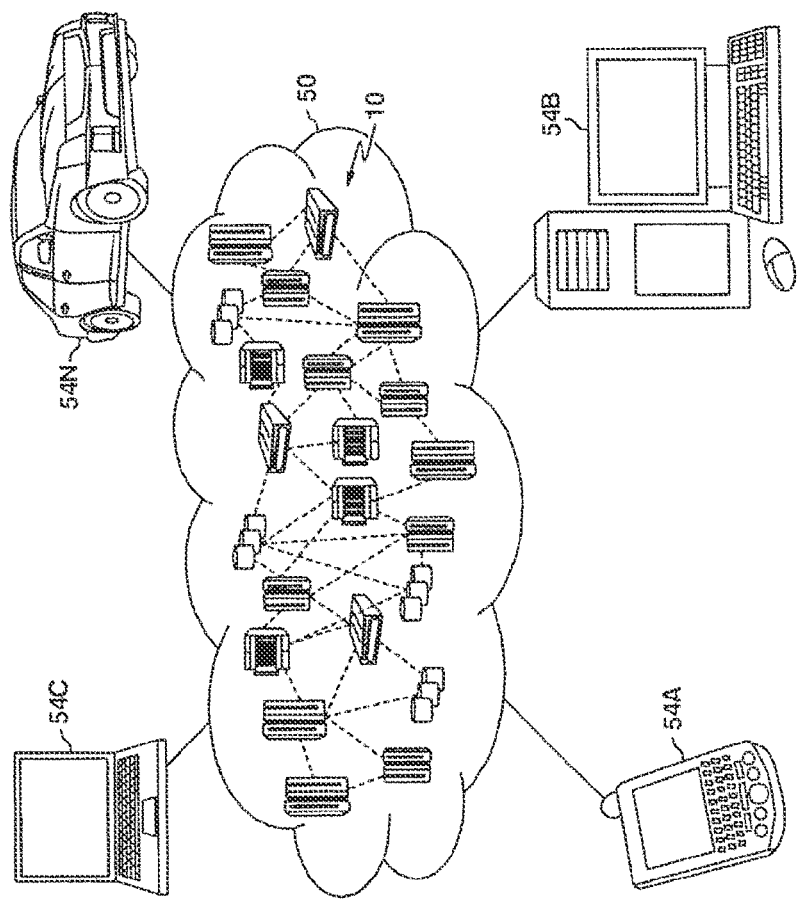
FIG. 10 depicts a cloud computing environment according to an embodiment of the present disclosure.

Referring now to FIG. 10, illustrative cloud computing environment 150 is depicted. As shown, cloud computing environment 150 includes one or more cloud computing nodes with which local computing devices used by cloud consumers, such as, for example, personal digital assistant (PDA) or cellular telephone 54A, desktop computer 54B, laptop computer 54C, and/or automobile computer system 54N may communicate. Nodes may communicate with one another. They may be grouped (not shown) physically or virtually, in one or more networks, such as Private, Community, Public, or Hybrid clouds as described hereinabove, or a combination thereof. This allows cloud computing environment 150 to offer infrastructure, platforms and/or software as services for which a cloud consumer does not need to maintain resources on a local computing device. It is understood that the types of computing devices 54A-N shown in FIG. 10 are intended to be illustrative only and that computing nodes and cloud computing environment 150 can communicate with any type of computerized device over any type of network and/or network addressable connection (e.g., using a web browser).

Figure 11:
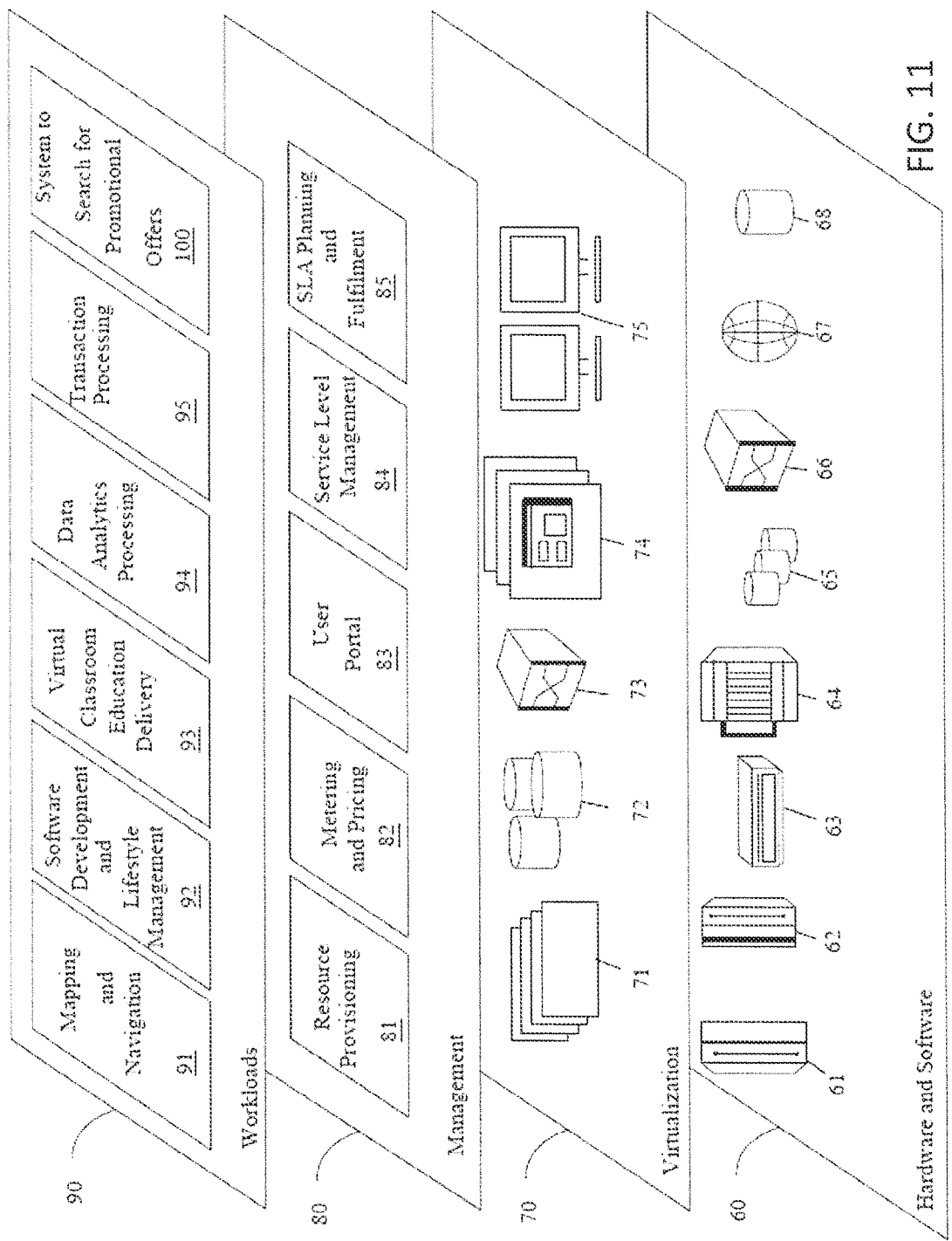
FIG. 11 depicts abstraction model layers according to an embodiment of the present disclosure.

Referring now to FIG. 11, a set of functional abstraction layers provided by cloud computing environment 150 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and the system 100 that employs visual artefacts including pictograms to search source code.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method for searching data repositories using pictograms and machine learning (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for searching stored data using pictograms comprising:
   creating a pictogram repository of pictograms including expressions that are mapped to at least a portion of data that is stored in a separate data repository;
   recording a score for developers for the at least the portion of the data that is stored in the data repository;
   receiving a search inquiry of at least one pictogram for search query elements
   matching the at least one pictogram for the search query elements to the pictograms in the repository of pictograms that includes expressions that are mapped to the at least the portion of the data that is stored in the separate data repository;
   checking the score for the developers for matching data from the pictograms in the repository of pictograms corresponding to the at least one pictograms for search query elements against a threshold value; and
   returning data meeting the search query elements and having a score for the developers meeting the threshold value to users that provided the search inquiry.

2. The computer-implemented method of claim 1, wherein the data that is stored in the separate data repository includes at least a portion of source code.

3. The computer-implemented method of claim 1, wherein the recording the score for developers for the at least the portion of the data that is stored in the data repository includes the score being provided by users that provided search inquiry over a history of the pictogram repository being created and updated, the score reflecting success of the data matching description provided by the pictograms in the pictogram repository.

4. The computer-implemented method of claim 3, wherein the creating of the pictogram repository of pictograms including expressions that are mapped to the at least the portion of data that is stored in a separate data repository is created by data uploaded by the developers for storage on the separate data repository, wherein the developers provide in combination with the upload of the data the pictograms having matching description for the data and being mapped to the data repository to which the data is being uploaded.

5. The computer-implemented method of claim 1, wherein the receiving of the search inquiry of the at least one pictogram for search query elements includes converting the at least one pictogram to a text based program language.

6. The computer-implemented method of claim 5, wherein the text based program language comprises extensible markup language (XML) format.

7. The computer-implemented method of claim 1, wherein the recording the score for developers for the at least the portion of the data that is stored in the data repository includes the score being recorded in a database of developers that is stored in the repository of pictograms.

8. A system for searching stored data using pictograms comprising:
a hardware processor; and
a memory that stores a computer program product, which, when executed by the hardware processor, causes the hardware processor to:
create a pictogram repository of pictograms including expressions that are mapped to at least a portion of data that is stored in a separate data repository;
record a score for developers for the at least the portion of the data that is stored in the data repository;
receive a search inquiry of at least one pictogram for search query elements;
matching the at least one pictogram for the search query elements to the pictograms in the repository of pictograms that includes expressions that are mapped to the at least the portion of data that is stored in the separate data repository;
check the score for the developers for matching data from the pictograms in the repository of pictograms corresponding to the at least one pictograms for search query elements against a threshold value; and
return data meeting the search query elements and having a score for the developers meeting the threshold value to users that provided the search inquiry.

9. The system of claim 8, wherein the data that is stored in the separate data repository includes at least a portion of source code.

10. The system of claim 8, wherein the recording the score for developers for the at least the portion of the data that is stored in the data repository includes the score being provided by users that provided search inquiry over a history of the pictogram repository being created and updated, the score reflecting success of the data matching description provided by the pictograms in the pictogram repository.

11. The system of claim 8, wherein the creating of the pictogram repository of pictograms including expressions that are mapped to the at least the portion of the data that is stored in a separate data repository is created by data uploaded by the developers for storage on the separate data repository, wherein the developers provide in combination with the upload of the data the pictograms having matching description for the data and being mapped to the data repository to which the data is being uploaded.

12. The system of claim 8, wherein the receiving of the search inquiry of the at least one pictogram for search query elements includes converting the at least one pictogram to a text based program language.

13. The system of claim 12, wherein the text based program language comprises extensible markup language (XML) format.

14. The system of claim 8, wherein the recording the score for developers for the at least the data that is stored in the data repository includes the score being recorded in a database of developers that is stored in the repository of pictograms.

15. A computer program product that employs pictograms as search query elements comprising a computer readable storage medium having computer readable program code embodied therewith, the program instructions executable by a processor to cause the processor to:
create, using the processor, a pictogram repository of pictograms including expressions that are mapped to at least a portion of source code that is stored in a separate source code repository;
recording, using the processor, score for developers for the at least the portion of source code that is stored in the source code repository;
receive, using the processor, a source code search inquiry of at least one pictograms for search query elements;
match, using the processor, the pictograms in the repository of pictograms that includes expressions that are mapped to at least a portion of source code that is stored in the separate source code repository;
check, using the processor, the score of the developer for the matching source code from the pictograms in the repository of pictograms corresponding to the at least one pictograms for search query elements against a threshold value; and
retrieve, using the processor, source code meeting the search query elements and having a score for the developers meeting the threshold value to users that provided the source code search inquiry.

16. The computer program product of claim 15, wherein the data that is stored in the separate data repository includes at least a portion of source code.

17. The computer program product of claim 15, wherein the recording the score for developers for the at least the portion of the data that is stored in the data repository includes the score being provided by users that provided search inquiry over a history of the pictogram repository being created and updated, the score reflecting success of the data matching description provided by the pictograms in the pictogram repository.

18. The computer program product of claim 15, wherein the creating of the pictogram repository of pictograms including expressions that are mapped to the at least the portion of the data that is stored in a separate data repository is created by data uploaded by the developers for storage on the separate data repository, wherein the developers provide in combination with the upload of the data the pictograms having matching description for the data and being mapped to the data repository to which the data is being uploaded.

19. The computer program product of claim 15, wherein the receiving of the search inquiry of the at least one pictogram for search query elements includes converting the at least one pictogram to a text based program language.

20. The computer program product of claim 19, wherein the text based program language comprises extensible markup language (XML) format.

* * * * *